Figure 1:
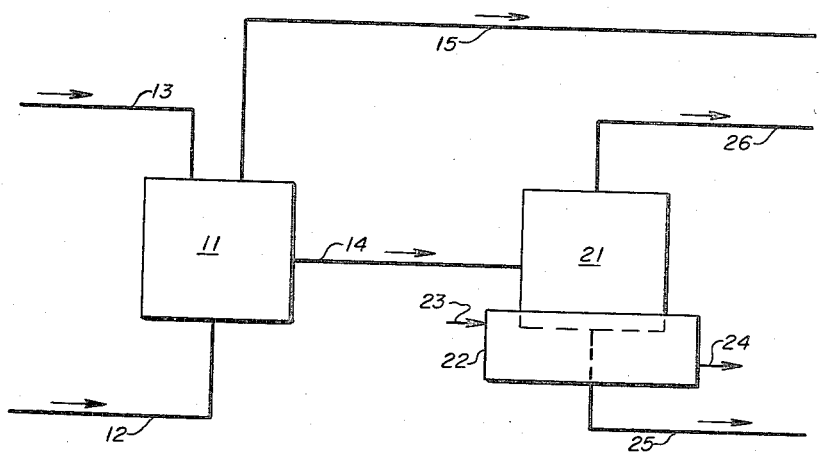

March 18, 1958 M. L. GOULD 2,827,129
HYDROGEN CHLORIDE RECOVERY
Filed Dec. 21, 1955 2 Sheets-Sheet 2

United States Patent Office 2,827,129
Patented Mar. 18, 1958

2,827,129

HYDROGEN CHLORIDE RECOVERY

Merle L. Gould, Baton Rouge, La., assignor to Ethyl Corporation, New York, N. Y., a corporation of Delaware Application December 21, 1955, Serial No. 554,457

4 Claims. (Cl. 183—115)

This application is a continuation-in-part of Serial No. 474,826, filed December 13, 1954, now abandoned.

This invention relates to the resolution of certain process gas mixtures. More specifically, the invention relates to the resolution of a process mixture including substantial proportions of hydrogen chloride and ethane, particularly such process streams obtained in an ethane chlorination.

The manufacture of lower molecular weight alkyl chlorides can be accomplished by three general methods. In the preparation of ethyl chloride, for example, ethanol can be reacted with hydrochloric acid, or hydrogen chloride can be reacted with ethylene, or ethane can be treated with chlorine to form ethyl chloride by substitution chlorination. The latter reaction offers sizeable basic economies and advantages because of the appreciably lower cost of alkane hydrocarbons relative to equivalent amounts of a corresponding alcohol or olefin, providing that the hydrogen chloride can be recovered and used, and further provided that a high conversion of the ethane can be achieved. As is well known, in the substitution chlorination of an alkane, approximately one-half of the chlorine reacted appears in the products as hydrogen chloride. It is further well known that a chlorination process should be operated with a substantial excess of ethane, or, stated conversely, that an appreciable concentration of ethane is always found in the product gases.

It has been proposed to take advantage of the ultimate economies of the chlorination reaction by reusing the hydrogen chloride in a hydrochlorination process, and also recirculating the excess ethane to the ethane chlorination operation. However, a hydrochlorination process cannot tolerate too great dilution with ethane gas, and similarly it is of course unworkable to recycle all the hydrogen chloride present to a chlorination process. Hence, in order to economically carry out a chlorination of ethane, it is essential to provide economical means of resolving the product gases to effect a resolution into an ethane enriched gas stream, and a hydrogen chloride enriched stream as well as recovering the chlorinated ethane primary product.

Prior general methods of isolating hydrogen chloride from gaseous mixtures of this general character have included several general types. Absorption in aqueous solution is frequently employed, but non-metallic, low pressure equipment is demanded, because of the extreme corrosivity of aqueous solutions. Selective absorption of the hydrocarbon components of the mixture in added hydrocarbons has been utilized in other similar mixtures. Glacial acetic acid has been suggested for a hydrogen chloride absorbent. Liquefaction of the hydrogen chloride-alkane components and subsequent fractionation has been proposed, but this technique would not be beneficial for the hydrogen chloride-ethane system because these compounds form a constant boiling mixture. A pressing need then has existed for the economical resolution of the products of an ethane chlorination process.

Accordingly, a principal object of the present invention is to provide a new and improved process for the resolution of a stream derived from an ethane chlorination into an ethane enriched gas stream and a hydrogen chloride enriched gas stream. Another object is to provide a product gas separation process of the character described which is particularly suitable for operation at elevated pressures and which does not require expensive and fragile corrosion resistant equipment. Yet another object is to provide a process which accomplishes the stated resolution into an anhydrous ethane enriched stream and an anhydrous hydrogen chloride enriched gas stream, these streams being particularly suitable without further refinement for subsequent reusage.

The process of the invention comprises, in its most general terms, the contacting of a gaseous mixture with a chlorinated ethanes liquid under elevated pressures and in certain proportions defined more fully hereafter, the gaseous mixture being predominantly, on a chlorinated ethanes free basis, hydrogen chloride and ethane. A portion of the gas stream is dissolved in the liquid phase, this dissolved portion or solute being substantially enriched in hydrogen chloride. An enriched hydrogen chloride gas is then obtained by selective vaporization of the hydrogen chloride from the solution. In the absorption of a hydrogen chloride enriched stream, the undissolved gas is enriched in ethane content. The degree of enrichment can, as will be shown hereafter, be varied greatly to meet the needs of a particular operation. Similarly, the composition of the liquid used is variable in a wide latitude, except that it should be substantially all chloroethanes, and, further, that the average chlorine content should be less than about 1.4 atoms of chlorine per atom of carbon, and, preferably should have an average composition of from about 0.5 to 0.6 atom of chlorine per atom of carbon.

In general, best results are obtained using hydrocarbon chlorides having 5 carbon atoms and lower. The preferred hydrocarbons contain 2 to 3 carbon atoms, i. e., ethanes and propanes. The preferred chlorine atom to carbon atom ratio should be between 0.3–1. The preferred chloroethanes include ethyl chloride, ethylene dichloride, propyl chloride, and propylene dichloride. Other typical examples of other chlorinated alkanes are methyl chloride, tetrachloro propane, n-chlorobutane, dichlorobutane, and chlorohexane.

The surprising feature of the process is that, whereas other processes have been disclosed wherein a chlorohydrocarbon is employed as an absorption medium, in such instances the hydrocarbon component was preferentially absorbed. Likewise, other solvents such as oxy compounds such as dioxane have been used for extracting hydrogen chloride from both the lower hydrocarbons and halogenated hydrocarbons. In contrast, according to the present process, the enrichment is in the reverse order, i. e., the hydrogen chloride is enriched in the liquid phase and the ethane is enriched in the gas phase by the initial step of the process. A further important aspect of the invention is the discovery that the azeotrope mixture of hydrogen chloride and ethane is resolved by the present method. Thus, even though the feed stream being processed contains, as it frequently does, hydrogen chloride and ethane in proportions generally corresponding to azeotrope compositions, the desired resolution is readily accomplished.

The benefits of the process can be obtained in a variety of embodiments yielding varying degrees of separate enrichment. The demands of related operations will determine primarily the specific embodiment to be employed. Thus, in certain situations a "sloppy" separation is all that is necessary and in such an environment a relatively simple embodiment of the process is preferred. Thus, in situations where a subsequent ethane consuming stream and a subsequent hydrogen chloride consuming stream will tolerate relatively large quantities of the other component as an impurity (i. e., hydrogen chloride in ethane or conversely ethane in hydrogen chlorine), a simple enrichment is feasible. In other situations, of which an example is a subsequent chemical oxidation of the hydrogen chloride to regenerate a relatively pure chlorine stream, a rather complex embodiment of the invention is desired to secure the necessary enrichment.

Although not limiting, generally the embodiments of the process include the following major variations:

Single-stage condensation—This embodiment is the simplest mode of application of the invention. The embodiment involves contacting the stream to be resolved with a liquid chloroethanes stream of the character described, under elevated pressure conditions to result in formation of a liquid phase wherein the chloroethanes components are not less than about 60 mole percent and the solute is enriched in hydrogen chloride and the undissolved gas stream is enriched in ethane over the original composition. The gas and liquid phases are separated, and the liquid phase is fractionated to separate the hydrogen chloride enriched solute from the phase.

Multi-stage absorption and fractionation—In this embodiment, substantially the same operations are carried out except that the degree of enrichment is enhanced by employing a multi-plate absorption column for contacting the feed gas stream with the chloroethanes solvent.

Multi-stage absorption with reboiling—This embodiment is a further refinement in that in the absorption stage a reboiling operation is conducted jointly with the multi-stage countercurrent absorption resulting in even greater enrichment and sharpness of separation.

Extractive distillation—In this embodiment of the process, the initial absorption step is further refined by providing an overhead condenser for a multi-stage contacting tower in addition to the reboiler for providing lower ethane content in the liquid stream removed from this step.

In all of the foregoing species of the invention, the supplemental or second step of isolating the hydrogen chloride enriched stream from the chloroethanes liquid from the first stage may be carried out similarly in varying degrees of complexity. Generally, it is preferred to operate this stage of the process as a multi-stage fractionation operation and at a higher temperature than the first stage.

Figure 2:
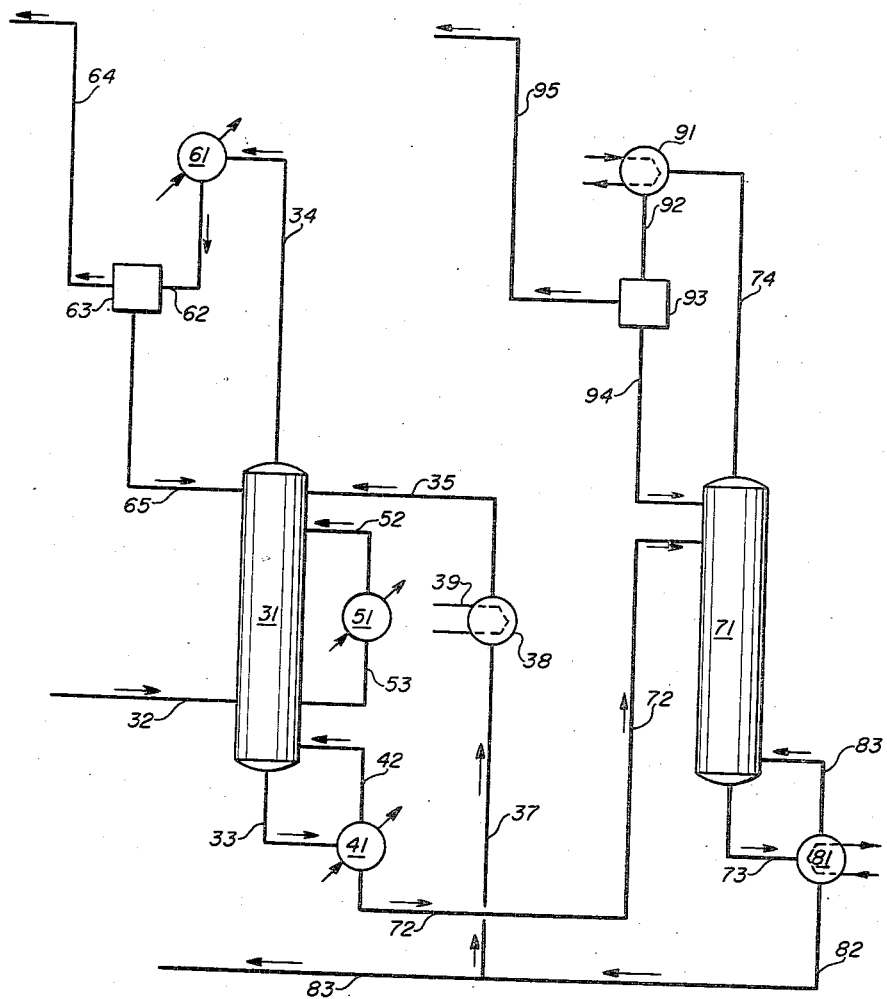

The details of the characteristics of the materials employed in the process and in the several embodiments thereof will be more readily understood from the detailed description given hereafter and from the accompanying figures, wherein Figure 1 is a schematic flow diagram showing the process flows and generalized equipment arrangement for the simplest embodiment of the process, involving a single stage absorption and a single stage vaporization operation, and Figure 2 is a similar schematic flow diagram of an embodiment providing the highest degree of separate enrichment of the streams.

The examples and detailed description given hereafter will be more readily understood with the aid of a preliminary explanation of the apparatus arrangement shown in the above cited figures. Referring to Figure 1, this illustrates the apparatus for the most straightforward embodiments of the process of the invention, wherein a single stage first contacting step is followed by a single stage second or vaporizing step. The principal units of the installation includes a contactor 11 and a vaporizer 21. The contactor 11 is a drum which can vary somewhat in complexity, including if desired internal elements for intimate contacting of gas and liquid streams. Generally, the function of this drum is to assure an intimate and equilibrium contact of the components fed thereto and discharged at the conditions of operation. The vaporizer 21 is similarly a simple drum or tower, fitted or provided with a heat providing shell 22, wherein a heating medium can be introduced through heating medium feed line 23 and discharged through an outlet line 24. The feed lines to the equipment include a gas feed line 12, and a liquid feed line 13, both feeding streams to the contactor 11. The gas feed line 12 enters the contactor 11 preferably at a lowermost point therein, and generally the contactor 11 is operated so as to maintain a liquid reservoir of material to assure intimate contact of the gas fed. A liquid draw off line 14 provides for continuous or intermittent withdrawal of liquid from the contactor and feed to the vaporizer 21. An overhead line 15 is provided to remove an overhead ethane-enriched stream from the contactor 11 and discharge it to subsequent operations such as an ethane chlorination step or for various recycle purposes.

In the vaporizer 21 an equilibrium condition is again provided for by heating the liquid fed therein by the transfer line 14 to provide a gas phase enriched in hydrogen chloride which can be discharged through an overhead gas line 26 to a subsequent consuming operation such as an ethylene hydrochlorination process. The bottoms or liquid phase from the vaporizer 21 can be discharged through a bottoms liquid line 25.

The proportions and explicit design of the contactor 11 and the vaporizer 21 can be varied of course according to the pressure and temperature of operation contemplated.

Turning to Figure 2, a more complex installation of apparatus for a refined embodiment of the process of the invention is illustrated. Again, the principal units of the apparatus include a contactor 31 and a vaporizing tower 71. The contactor 31 is a multi-stage contactor, either of the multi-plate type or a packed column type, provided with a reboiler 41, a side stream cooler 51, and an overhead condenser 61. A feed line 32 introduces fresh feed to the contacting tower 31. An overhead line 34 transmits overhead gases to a reflux condenser 61, which discharges a partially condensed stream through a line 62 to a disengaging drum 63. The disengager 63 separates the gas phase from the liquid phase. The gas phase discharge line 64 removes the so-separated gas, and a liquid return line 65 receives the liquid disengaged for return to the contacting tower 31. Additional streams to the contacting tower 31 are provided by a recycled absorbent line 35, and a reboiled vapor line 42 from the reboiler 41. A bottoms line 72 from the reboiler 41 is a liquid feed line to the vaporizing tower 71. The vaporizing tower is preferably a multi-plate fractionation column provided with a reboiler 81 and an overhead condenser 91. A bottoms line 73 from the tower 71 feeds bottom liquid to the reboiler, and a reboiler discharge line 82 transmits liquid from the reboiler 81. An overhead vapor line 74 from the vaporizing tower 71 feeds a condenser 91 which effects a partial condensation of the higher boiling components. The condensate line 92 transmits partially condensed materials from the condenser 91 to a disengaging drum 93. Disengaged liquid is returned through a line 94 to the vaporizing tower 71, and an enriched hydrogen chloride line 95 receives the disengaged gas, high in hydrogen chloride content, from a disengaging drum 93. Reboiled vapor separated from bottoms by the reboiler 81 is returned to the bottom zone of the distillation tower 71.

The bottoms line 82 from the reboiler 81 divides into a recycle line 37 and a transfer line 83. The recycle line 37 returns a portion of the liquid available in the bottoms product line 82 through a pre-cooler 38 fitted of course with a coolant or refrigerant supply line 39. The apparatus illustrated and described above is susceptible of providing a much higher degree of enrichment of the respective streams in an embodiment of the process than is the embodiment illustrated schematically in Figure 1, but of course it will also be apparent that a substantially higher relative investment is required.

The examples given below illustrate the respective characteristics of several embodiments of the process described with reference to the figures, Example I being a description of an embodiment wherein a single stage contacting first step is employed, plus a single stage second vaporizing operation.

Example I

A feed gas stream is admitted to the contactor 11 through line 12 and contacted with a liquid fraction therein at a temperature of about 120° F. and 100 pounds per square inch gauge. The liquid was withdrawn continuously and the non-condensed gas was discharged overhead through line 15. The liquid is passed to the vaporizer 21, maintained at a temperature of 150° F. The pressure was similarly maintained at 125 pounds per square inch gauge. An overhead gas fraction, comprising an enriched hydrogen chloride fraction was discharged by the vaporization through line 26, the bottoms being discharged through line 25.

The gas feed through line 12 contains roughly equimolal proportions of hydrogen chloride and ethane. The chloroethanes absorbent liquid, ethyl chloride containing 10 percent by weight ethylene dichloride, is employed in varying ratio, usually of from about one to five moles per mole of the hydrogen chloride present in the feed gas. The first stage contacting is performed under elevated pressure and preferably at low or moderate temperatures adjusted so that the liquid phase formed in the absorber is relatively high in chloroethanes component, that is, so that the liquid phase contains above 60, and preferably from 75 to 90 mole percent chloroethanes. In the vaporizing step, a high temperature and pressure is employed, this resulting in effect, in further enrichment of the ultimate gaseous product. The reason for the further enrichment is because it has been discovered that the ratio of volatilities of ethane to hydrogen chloride, in chloroethanes, decreases at higher temperatures. Therefore, in a single stage vaporization, the hydrogen chloride driven off is not diluted to the same extent with ethane if the vaporizing step is performed at a higher temperature than the recovery step.

As an example of a more highly refined embodiment of the process, the Example II following illustrates the high degree of enrichment of the respective streams which is readily realizable.

Example II

A gaseous stream derived from a thermal chlorination of ethane operation is available at a pressure of approximately 110–115 pounds per square inch gauge and a temperature of about 60°–70° F. The stream contains hydrogen chloride and ethane in the proportions of approximately one mole of hydrogen chloride to two moles of ethane. The stream is fed to the contacting tower 31, concurrently with a return liquid stream introduced through line 35, this stream containing approximately 90 mole percent of ethyl chloride, and less than five percent hydrogen chloride. The recycled chloroethanes absorbent liquid fed through line 35 is in the proportions of about 72 moles per 100 moles of feed gas. The absorbing tower 31 is operated with an overhead pressure of approximately 90 pounds per square inch gauge and an overhead temperature of about 18° F. The bottoms temperature is about 80° F. The bottoms stream is very low in ethane content and high in hydrogen chloride, the respective mole concentrations of these components being in the mole ratio of about 9.2:1 $HCl:C_2H_6$. The overhead gas is highly enriched in ethane, containing only about one-tenth mole of HCl per mole of ethane, the ethane concentration being over 80 mole percent. The bottom stream is fed through line 72 to the second stage fractionator 71, which is operated at a pressure of approximately 140 pounds per square inch gauge, with a bottoms temperature of 190° F. The overhead gas from the second stage fractionator 71 contains almost 90 percent hydrogen chloride, which is delivered directly to a subsequent operation such as an ethylene hydrochlorination plant. The details of the compositions of the streams in this embodiment are given in the accompanying table.

| Component | Stream Compositions—Mole Percent | | | | |
| --- | --- | --- | --- | --- | --- |
| | Feed Gas 32 | Contactor Bottoms 72 | Overhead from Contactor 64 | Fractionator Bottoms 82 | Fractionator Overhead 95 |
| Methane—$CH_4$ | 0.9 | | 1.6 | | |
| Ethylene—$C_2H_4$ | 3.7 | | 6.8 | | |
| Ethane—$C_2H_6$ | 49.1 | 2.3 | 82.3 | | 11.5 |
| Hydrogen chloride | 26.5 | 21.6 | 8.5 | 4.6 | 88.5 |
| Methyl-vinyl chlorides | | 0.7 | | 1.0 | |
| Ethyl chloride | 18.9 | 71.8 | 0.9 | 90.0 | |
| Dichloroethanes | 0.9 | 3.6 | | 4.4 | |
| | 100.0 | 100.0 | 99.9 | 100.0 | 100.0 |
| Quantities—100 moles feed | 100 | 116 | 57 | 93.5 | 23.6 |
| Ratio $HCl:C_2H_6$ | 0.54 | 9.2 | 0.10 | | 7.7 |

Split of Fractionator Bottoms:
  To Contactor _____ 72
  To Recovery _____ 21.5

When the above examples are repeated using pure ethyl chloride, a dichloroethane or chloropropane, similar results are obtained.

From the foregoing examples it will be seen that the method of the process provides a highly effective means of effecting readily and simply a resolution of a hydrogen chloride-ethane stream into streams enriched in both components. The precise manner of performing the process is susceptible of great variation, limited only by the following claims.

I claim:

1. A process of separating an anhydrous gaseous stream comprising essentially a mixture of hydrogen chloride and ethane into an ethane enriched branch and a separate hydrogen chloride enriched branch, said process including the steps of contacting said stream under elevated pressure with a chlorohydrocarbon scrubbing liquid having not more than 5 carbon atoms per molecule and less than 1.4 atoms of chlorine per carbon atom to cause the hydrogen chloride to be preferentially dissolved by the scrubbing liquid, forming a liquid having not less than about 60 mole percent chlorohydrocarbon, then separating the thus formed liquid to leave an ethane-enriched gas and vaporizing a hydrogen chloride enriched gas from the separated liquid.

2. The process of claim 1 further defined in that the scrubbing liquid is a chloroethane containing from about 0.5 to 0.6 chlorine atom per atom of carbon.

3. The process of claim 2 further defined in that the vaporizing step is carried out at a higher temperature than the contacting step.

4. The process in claim 3 further defined in that the vaporizing step is carried out at a higher pressure than the contacting step.

References Cited in the file of this patent

UNITED STATES PATENTS 2,282,712    Engs et al. --------------- May 12, 1942